United States Patent [19]

Colamonico et al.

[11] Patent Number: 5,311,504
[45] Date of Patent: May 10, 1994

[54] BASE STATION FOR A MOBILE DIGITAL SYSTEM WITH THE FREQUENCY HOPPING TECHNIQUE

[75] Inventors: Armando Colamonico; Marcello Donati, both of Milan, Italy

[73] Assignee: Italtel Societa Italiana Telecomunicazioni S.p.A., Milan, Italy

[21] Appl. No.: 777,309

[22] PCT Filed: Jan. 22, 1990

[86] PCT No.: PCT/EP90/00159

§ 371 Date: Jan. 31, 1992

§ 102(e) Date: Jan. 31, 1992

[87] PCT Pub. No.: WO90/16122

PCT Pub. Date: Dec. 27, 1990

[30] Foreign Application Priority Data

Jun. 15, 1989 [IT] Italy ................. 20890 A/89

[51] Int. Cl.$^5$ .................................. H04J 3/16
[52] U.S. Cl. ........................... 370/50; 370/95.1
[58] Field of Search .......... 370/50, 95.1, 95.3, 370/70, 29, 100.1, 30, 109; 379/60, 61, 63, 59; 455/34.1, 54.1; 375/1

[56] References Cited

U.S. PATENT DOCUMENTS

| | | | |
|---|---|---|---|
| 3,399,278 | 8/1968 | Dahlman et al. | 370/50 |
| 4,768,218 | 8/1988 | Yorita | 379/61 |
| 4,852,090 | 7/1989 | Borth | 370/95.3 |
| 5,124,985 | 6/1992 | Hoshikawa | 370/95.3 |

FOREIGN PATENT DOCUMENTS

2036112 2/1987 Fed. Rep. of Germany.
2043402 10/1980 United Kingdom.

OTHER PUBLICATIONS

IBM Journal of Research and Development, vol. 9, No. 2, Mar. 1965, New York, US.

Primary Examiner—Benedict V. Safourek
Assistant Examiner—Dang Ton

[57] ABSTRACT

A base station in a mobile digital system (TDMA/FDMA) utilizes a frequency hopping technique. The interconnection among receiver/transmitters (RT1-RTm) and process nodal points (NP1-NPm) takes place in base band using a common medium as distribution means of data relevant to the different users, which are entered on and sensed from at least one bus (B, B'). According to one embodiment two separate bus are foreseen, one for transmission and the other one for reception.

10 Claims, 2 Drawing Sheets

BASE STATION FOR A MOBILE DIGITAL SYSTEM WITH THE FREQUENCY HOPPING TECHNIQUE

DESCRIPTION

The present invention relates to digital cell mobile systems more particularly the base station (SRB) which controls connections inside one cell or call areas into which the territory covered by the service is subdivided.

BACKGROUND OF THE INVENTION

In a mobile system of this kind, both voice and signalling data are transmitted in a digital manner by modulating a carrier frequency. Each carrier supports n users whose bit bursts are grouped to form a time division frame (TDMA). The system has a given number K of usable frequencies which are differently distributed in the different cells depending on their traffic, up to a maximum of m frequencies per one very high traffic density cell, for a total of $m \times n$ possible simultaneous speech (physical channels). Thanks to the cell subdivision, the same frequencies are assigned to more cells far enough among them to avoid interference, thus obtaining a high spectrum effectiveness. One of the features foreseen in digital mobile systems to mediate speech quality is that of frequency hopping.

According to this technique, during the speech, the time slot assigned to one user hops on a different frequency at each frame, while maintaining unchanged the frame structure. More specifically, the time slot of one user goes from a frequency (or carrier) to another one among those assigned to the base station (SRB) according to a predetermined law, but remaining in the same position inside the frame of n time slots.

In this way each speech can be time distributed on all the frequencies assigned to the SRB, and the result is that attenuation and distortion effects presented by one transmission frequency shall concern only a reduced number of frames of each user, and their negative effects shall be distributed among all users and not concentrated only on some of them.

It has been proposed to make the switch required by the frequency hopping directly by radio frequency or in base band.

In the first case, considering for instance the reception aspect, the base station foresees a plurality of receivers connected to a combining circuit receiving all frequencies assigned to the SRB from an antenna. Single receivers vary their frequency according to the frequency hopping algorithm and therefore each receiver always produces at the output the same n time slots assigned to the same n users which are routed in the known manner towards decoding units, and from there to the switched telephone network. The same takes place of course for transmission.

This solution is disadvantageous since it requires a broadband coupling among the antenna and each single receiver preventing a selective coupling. Furthermore, frequency synthesizers of the receivers has to be very quick, with switching time in the range of one hundred nanoseconds to perform the necessary frequency changes from a time slot and the subsequent one.

In case of baseband switching (interconnection), it is possible to use selection couplers (narrow band) among the combining circuit and each receiver/transmitters operating at fixed and constant frequency. The correct connection of each receiver/transmitter is carried out through a dynamic interconnection matrix which changes its configuration according to the frequency hopping algorithm to connect each receiver/transmitter with (time by time) correct process nodal point of the station controller.

A multiplexing matrix performing these interconnections constitutes however a centralized device involving a very high number of connections, and therefore problems exist with cost, reliability and difficulty of installation problems.

It is therefore a critical component which should be redundant (that is foreseen as double). In case of a maximum equipment of m frequencies, the matrix should have $(m \times n \times 2)^2$ cross points. This dimension should increase if it is requested to exchange through the same way to control data among nodal points. A separate connection should be foreseen for controlling data among nodal points and the station controller should be necessarily centralized.

One of the aims of the present invention is to overcome the above mentioned troubles of the previous technique, and in particular to simplify and optimize the interconnection of a plurality of receiver/transmitters among them, or between the station controller and the different nodal points which must be interconnected in this base station, in a system performing in base band the switching required by the frequency hopping technique.

Another aim of the invention is to realize an interconnection system, which carries in a flexible manner the data from and to the station control center, among receiver/transmitters, process nodal points and also the possible supervision, maintenance and data collection systems. Furthermore the system according to the invention has the advantage of being easily redundant.

SUMMARY OF THE INVENTION

This technical problem is solved with the invention which consists in a base station in a TDMA digital mobile system, in which the data associated to one user are transmitted as bit burst in a frame including n users, and in which each frame transmitted and received at a frequency changing according to a predetermined law among those assigned to the area served by the station (frequency hopping), the station including a distribution media for the baseband control of the frequency hopping characterized by the fact that said distribution media include at least a common medium (B, B') on which data are entered and sensed in time succession and at higher frequency. Further features of the invention are reported in sub-claims.

BRIEF DESCRIPTION OF THE DRAWINGS

The invention shall now be described, not for restrictive applications, making reference particularly to the preferred, but not restrictive, forms of realization shown in the enclosed drawings, where.

Figure 1:
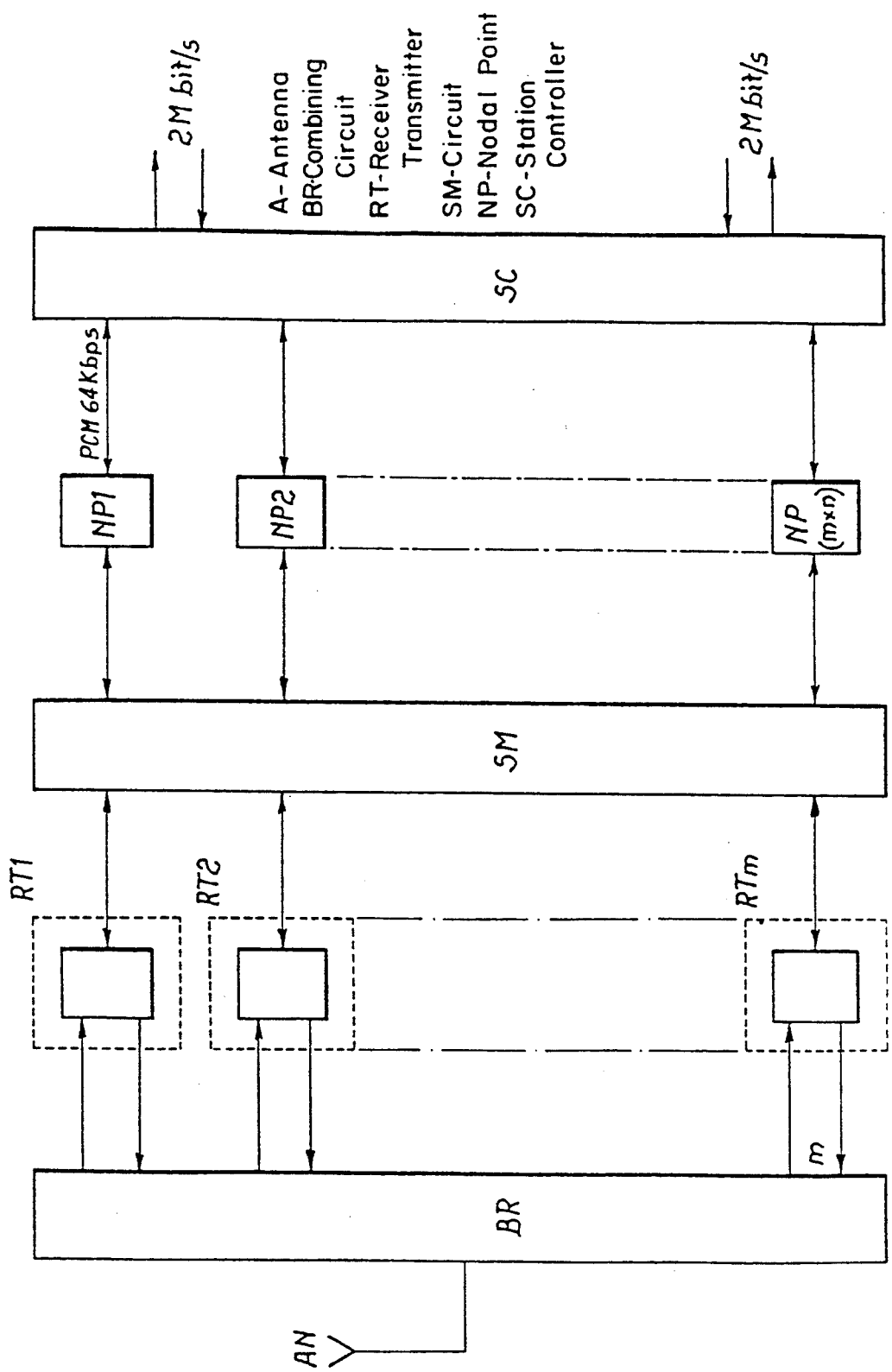
FIG. 1 shows a tentative block diagram of a base station with interconnection system performing the baseband frequency hopping.

With reference to the diagram in FIG. 1, the base station includes, on the reception/transmission side, an antenna AN connected to a combining circuits BR. As already stated, a base station can control up to m frequencies, for a total of m×n physical channels.

m receiving-transmitting circuits RT1-RTm are connected to the combining circuits, each one of them tuned in a constant frequency and connected to a switching or distribution circuit SM according to the invention which shall be described hereafter. The combining circuit BR has therefore the function of coupling a centralized unit such as the antenna AN to each single receiver/transmitter RT.

To circuit SM are connected m×n circuits marked NP, hereafter called also process nodal points, which in their turn are connected to the station controller SC. The station controller is connected to the switching and control center of the network or MSC (Mobile Switching Center) and, through 2 Mbit PCM flows, to the public telephone network. Beyond the MSC block, data are treated in the known manner according to conventional telephone techniques which are not described further.

Figure 2:
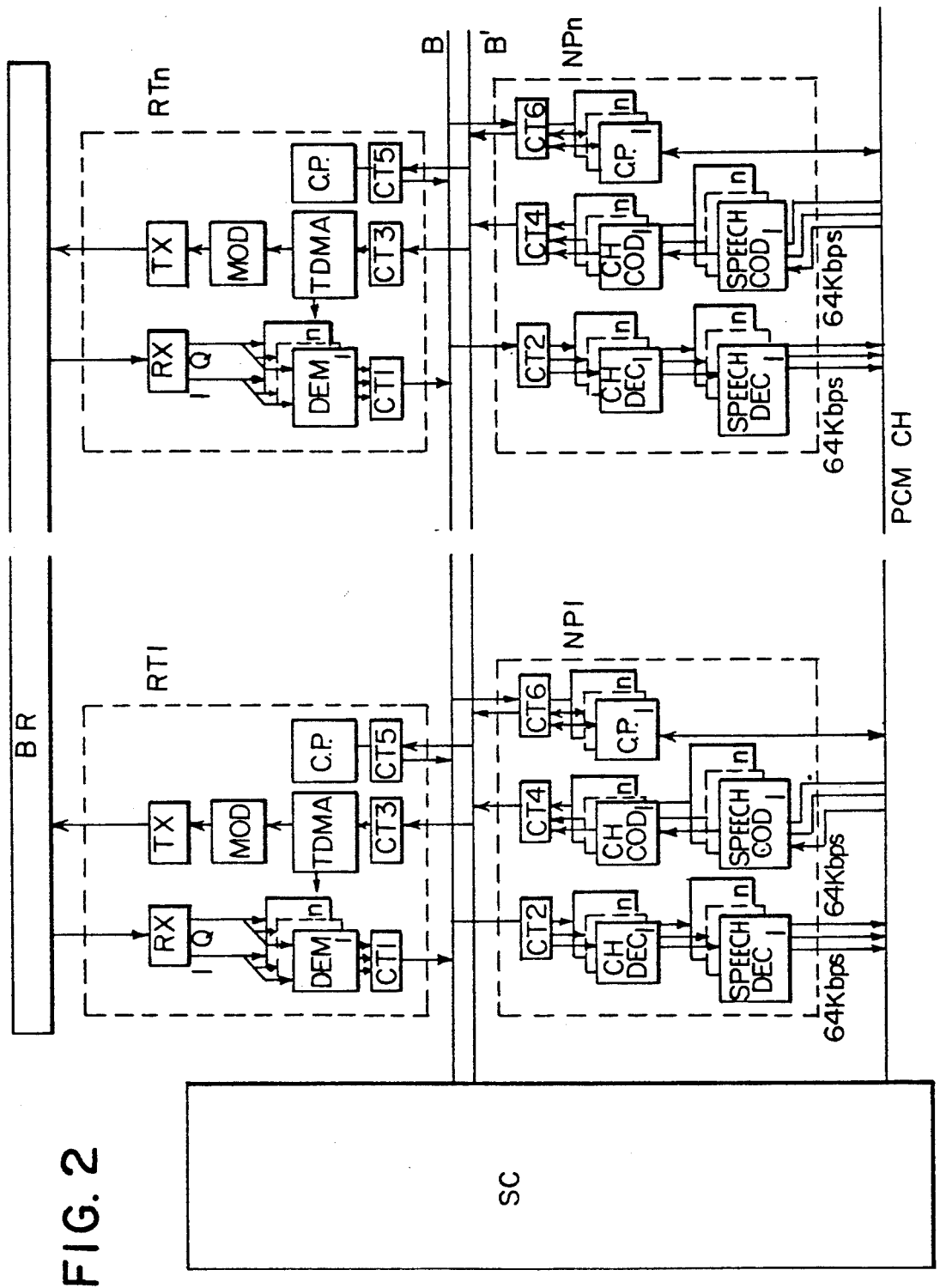
FIG. 2 shows more in detail the structure of a realization form of the station according to the invention.

With particular reference to FIG. 2, each receiver/transmitter RT includes a receiving and a transmitting section. The receiving section includes a base band converter Rx and a demodulator DEM formed by n separate plates, from each one of which the bit flow of a time slot is available, i.e. relevant to the single user. The receiver/transmitter includes also a transmitting section including a multiplexer TDMA for n time slots, a modulator MOD and a radiofrequency converter Tx. The two parts are connected to the combining circuit BR. In FIG. 2 the structure and the connection among nodal points NP and the n x m physical channels marked as PCM CH controlled by the station controller are highlighted better.

Process nodal points NP include, for each channel or user, a channel decoder (CH Codec) and a Speech decoder (Speech Codec) with 64 Kbps PCM flows from and to the MSC (Mobile Switching Center).

In presence of the frequency hopping, the subsequent data relevant to a given user shall not be constantly available on the same Rti, but on different RT according to the algorithm (known) controlling the frequency hopping.

On the other hand, to each user it is assigned, at the right of SM (FIG. 1), always the same channel in the same nodal point Npi. The circuit SM according to the invention is able to connect, following the frequency hopping algorithm, the output (on a variable RT) of the channel received at the input (always on the same nodal point) of the user nodal point, for the reception portion, and, for the transmission portion, to transfer the data relevant to a user, coming from a fixed nodal point, following the algorithm controlling the frequency hopping.

According to the invention and the reference to FIG. 2, the circuit SM includes a common medium B formed by two conductors or bus B, B' in which the data is time-division entered and extracted and correctly shunted. Bus forming a time-division common channel can be performed, for example with a coaxial cable, or with one or more balanced pairs of wires of adequate length. Binary data of the frame coming from frequency m, are compressed and transmitted at higher bit rate, to enable the time multiplexing on the common bus of all m×n channels, and serially entered on the common channel B, that is in series.

This is obtained through blocks CT1, CT2 for channels received (entering and extraction respectively), and through blocks CT3 and CT4 for channel to transmit (extraction and entering respectively), as well as through blocks CT5 and CT6 performing similar operations on control signals and signalings.

Blocks CT1 and CT4 take care of multiplexing and entering the compressed frame data, while blocks CT2 and CT3 take care of opening time slots by demultiplexing data. More in detail, CT1 enters data in series on bus B, and CT4 enters the same on bus B' according to the frequency hoping law, while CT2 opens time slots on bus B under the control of the frequency hopping law, and CT3 opens time slots in ordered sequence on bus B'.

In the case of a high number of receiver/transmitters and process nodal points, and therefore of a propagation time on the common channel which can become of the same magnitude of the elementary binary data (bit), further binary elements can be foreseen, added to the data of the single time slot, suitable to synchronize the reception units which control demultiplexing.

As for reception, each receiver Rx supplies binary data relevant to "n" channels/users as "n" time slots each frame. The "n ×m" time slots available from the plurality of receivers in each frame period, are orderly placed in series on the common channel B by means of multiplexing units CT1 which result being synchronized among them at frame level. There shall be therefore a unique matching between each single time slot (channel) and its position compared to the frame beginning.

The demultiplexing unit CT2 controls the extraction of the time slot which shall be processed by the units reporting to the telephone channel.

Since time slots pertaining to a telephone channel—due to frequency hopping—come from different receivers, their time position shall be different frame after frame. The demultiplexing unit CT2 extracts, according to a predetermined law, the correct data opening a time slot which position in the frame is dynamically variable.

As for transmission, multiplexing/demultiplexing takes place in an essentially similar way. Binary data relevant to "m ×n" channels/users are assigned on the common channel B' each frame period in time positions dynamically variable (according to the frequency hopping algorithm) through multiplexing units CT4. This algorithm is similar to the one controlling the CT2 operation. On the transmitter side, demultiplexing units CT3 shall orderly collect data entered in the bus by units CT4.

Units Ct5 and CT6 have the same methods of operation as CT1 ... CT4, but they carry control data and need not to be subject to the frequency hopping algorithm. All units CT1 ... CT6 are essentially made of a complex of logic circuits which receive at the input a common time reference signal T and taken care in the known manner to generate time slots during which circuits connected to the same take care to enter, or to extract, in bus B and B' the above mentioned data.

According to the realization form of the invention shown in FIG. 2, the common medium is made of two synchronized buses, one for transmission and the other one for reception. However, the description of data flow coming from the receiver towards the process units of the channel insisting on a channel (B) and the inverse flow on another channel (B') has no conceptual importance. This solution can be adopted for sake of simplicity or to reduce the total transmission speed. If this does not constitute a bound, a single physical medium can accomodate either data flows.

As already mentioned, multiplexing/demultiplexing units must all be synchronized. Synchronism data can be sent on the same physical medium using for instance a different allocation of the spectrum, or it can be distributed on a separate physical support.

For example, the frame of a mobile digital system can include 8 (n) time slots, and 124 (K) frequencies can be assigned to the system as a whole, resulting in a maximum allocation of 64 (m) frequencies for one single station with very high traffic concentration.

We claim:

1. A communication base station wherein data associated to each user are transmitted and received as a bit burst in a frame including n users, such frame also containing control data, and the frames are subject to frequency hopping in which each frame is transmitted and received at a frequency changing according to an algorithm among those frames assigned to the area served by said station, said station comprising:

a plurality of receiver/transmitters connected to a common antenna through a combining circuit;

a plurality of process nodal points connected to a station controller; and a distribution circuit for the baseband control of the frequency hopping including at least a common synchronized bus onto which user's data and said control data are entered and read in time succession at a bit rate higher than that of said bit burst;

said receiver/transmitters being connected to said synchronized bus at least through a first set of multiplexing units and a first set of demultiplexing units, said first sets of units being synchronized among themselves with respect to said frequency hopping;

said nodal points being connected to said synchronized bus at least through a second set of multiplexing units and a second set of demultiplexing units, said second sets of units being synchronized among themselves with respect to said frequency hopping.

2. Base station according to claim 1 wherein each one of said first set of multiplexing units is connected to the outputs of n demodulators of a receiver/transmitter, each of said first set of multiplexing units multiplexers and enters time sequenced compressed frame data, coming from said demodulators.

3. Base station according to claim 1, wherein each one of said first set of demultiplexing units is connected to the inputs of n time-division multiplexers of a receiver/transmitter, each of said first set of demultiplexing units in sequence with respect to said frequency hopping, extracts data destined for transmission.

4. Base station according to claim 1, wherein each one of said second set of multiplexing units is connected to the outputs of a plurality of channel coders, each of said second set of multiplexing units multiplexers and enters with respect to said frequency hopping, time compressed frame data coming from process nodal points.

5. Base station according to claim 1, wherein each one of said second set of demultiplexing units, is connected to the inputs of a plurality of channel decoders, each of said second sets of demultiplexing units, in sequence with respect to said frequency hopping, extracts data destined to process nodal points.

6. Base station according to claim 5, wherein at least said first and second sets of multiplexing and demultiplexing units are connected to said synchronized bus communicating control data.

7. Base station according to claim 1, wherein said synchronized bus includes two sub-buses, one for transmission and the other one for reception.

8. Base station according to claim 7, wherein said sub-bases include a coaxial cable.

9. Base station according to claim 7, wherein said sub-bases include balanced pairs of wires.

10. Base station according to claim 7, wherein the frame includes 8 time slots and that up to 64 frequencies out of a total availability of 124 frequencies can be assigned to the station.

* * * * *